A. E. SCHADT.
PLANTER ATTACHMENT.
APPLICATION FILED DEC. 12, 1911.
1,085,635.
Patented Feb. 3, 1914.
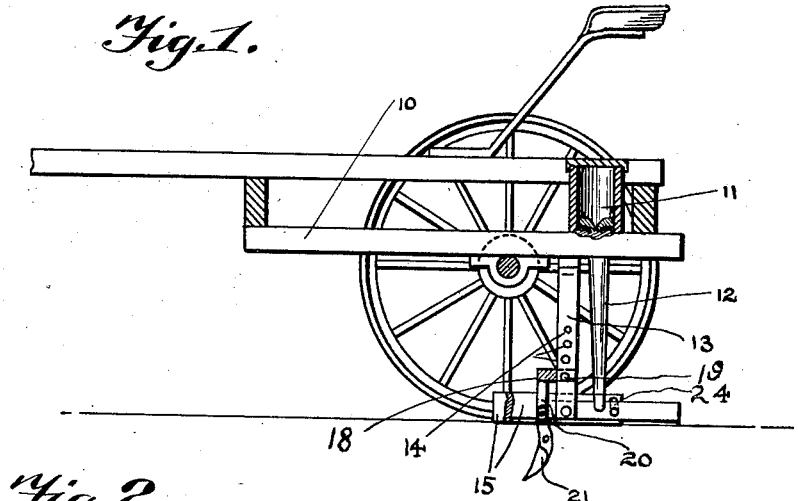
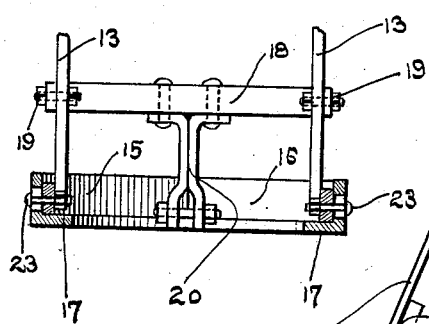
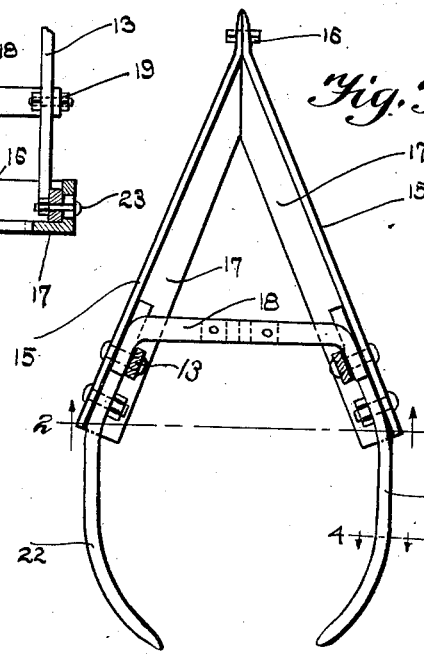
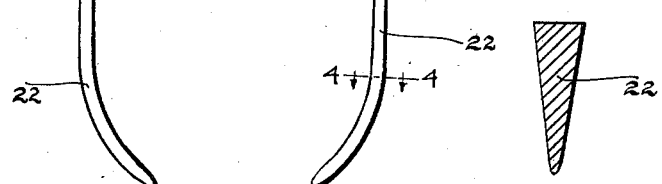
WITNESSES
INVENTOR
A. E. Schadt.
Attorney

UNITED STATES PATENT OFFICE.

ADAM EDWARD SCHADT, OF ROME, IOWA.

PLANTER ATTACHMENT.

1,085,635.  Specification of Letters Patent.  Patented Feb. 3, 1914.

Application filed December 12, 1911. Serial No. 665,219.

*To all whom it may concern:*

Be it known that I, ADAM E. SCHADT, a citizen of the United States, residing at Rome, in the county of Henry and State of Iowa, have invented certain new and useful Improvements in Planter Attachments; and I do hereby declare the following to be a full, clear, and exact description of the invention, such as will enable others skilled in the art to which it appertains to make and use the same.

This invention relates to new and useful improvements in planter attachments, and is designed particularly to construct a device whereby the depth of the seed in the ground may be regulated, at the same time producing a means whereby the seed may be covered after being located.

This invention further contemplates the provision of a small depth gage which readily coöperates with the standard seeders and planters now in use and which will overcome all the objectionable features heretofore predominate therein.

In the construction of planters and seeders previous to the present invention, a portion of the seeds were left exposed, that is were not covered, though disks and similar attachments were provided for performing this function. This objectionable feature is overcome by the present invention by the provision of oppositely disposed bars which will cover said seeds.

With the above and other objects in view, this invention consists in the construction, combination and arrangement of parts, all as hereinafter described, claimed and illustrated in the accompanying drawings, wherein:—

Figure 1 is a side elevation of a seeder and planter, parts thereof being in section, and illustrating the present invention applied thereto; Fig. 2 is a transverse section taken along the line 2—2, Fig. 3; Fig. 3 is a top plan view with parts sectioned of the attachment forming the subject matter of the present invention; and Fig. 4 is a transverse section taken along line 4—4, Fig. 3.

The attachment forming the subject matter of the present invention comprises a pair of convergent guide members, which are provided along their lower edges with horizontal flanges adapted to glide over the surface of the ground. The forward or adjacent terminals of the guide members are bolted or otherwise secured together, while the rear terminals are provided with inwardly curved bars which replace the dirt removed by a small plow located adjacent the vertex of said guide members.

Reference being had more particularly to the drawings; 10 indicates a sulky planter provided with the seed reservoir or hopper 11 connected with the conduit or delivery tube 12. A pair of depending bars 13, pierced by the openings 14, are mounted on the frame of the planter 10, and in advance of the delivery tube 12. A pair of convergent guides or gages 15, carried at the lower terminals of the arms 13, have their forward terminals bolted or otherwise secured together as at 16. The gages are secured intermediate, their ends to the lower ends of bars 13, and adapted to be adjusted upwardly and downwardly on said bars 13 by means of bolts 23 and slots 24 in the gages 15. The lower terminal of the conduit or delivery tube 12 terminates adjacent to the rear terminals of the guides 15 and delivers the seed between said bars. An inwardly extending horizontal flange 17 is formed on the lower edge of each vertical guide 15, and is adapted to glide over the surface of the ground as illustrated in Fig. 1.

A U-shaped bar 18 is interposed between the bars 13 and is adjustably mounted therebetween by the bolts 19, which pierce the depending bars 13. A depending bracket 20 is carried by the U-shaped bar or support 18, and has a plow tooth 21 removably secured to the lower terminals thereof, said plow tooth adapted to operate below the surface of the ground and also below the horizontal plane of the flanges 17.

From this construction it will readily be seen that as the planter 10 passes over the ground, the tooth 21 will open a furrow which will be directly between the gages 15. The seed delivery tube or conduit 12 will drop the seed directly into this furrow which will be covered as will hereinafter be more fully described.

Inwardly curved plates or bars 22 are secured to the rear terminals of the guides 15 by means of the bolts 23, which secure the bars 13 to said guides, said curved members lying alongside the guides 15 and on the flanges thereof and being bolted to the vertical flanges of 15 and having their rear ends curved inwardly. As illustrated in Fig. 4, these curved members taper toward the ground in order to provide for the positive engagement of the ground thereby. The guides 15 are provided with slots 24 therein, adapted to allow for adjustment of the plates or bars 22, vertically, in relation to the ground.

From the foregoing, it will readily be seen that after the seed has been dropped into the furrow the plates or bars 22 will cover the same.

Having thus fully described my invention, what I claim as new and desire to secure by Letters Patent, is:—

In combination with a planter, a gage plate attachment, vertically extending rods attached to the frame of the planter and provided with a plurality of apertures therein, a V-shaped gage secured to the lower terminals of said vertical rods and adapted to be adjusted upwardly and downwardly in relation to the ground, a U-shaped rod attached intermediate the ends of said vertical rods and adapted to be adjusted upwardly and downwardly, a bracket detachably mounted on said U-shaped rod, a plow detachably secured to the lower end of the bracket and means secured to the ends of the gage for covering the seeds.

In testimony whereof I affix my signature in presence of two witnesses.

ADAM EDWARD SCHADT.

Witnesses:
 VERNON WHITE,
 S. G. WHITE.

---

Copies of this patent may be obtained for five cents each, by addressing the "Commissioner of Patents, Washington, D. C."